Oct. 1, 1946.  A. S. KROTZ  2,408,520
TRUCK FOR RAIL VEHICLES
Filed June 29, 1943  2 Sheets-Sheet 1
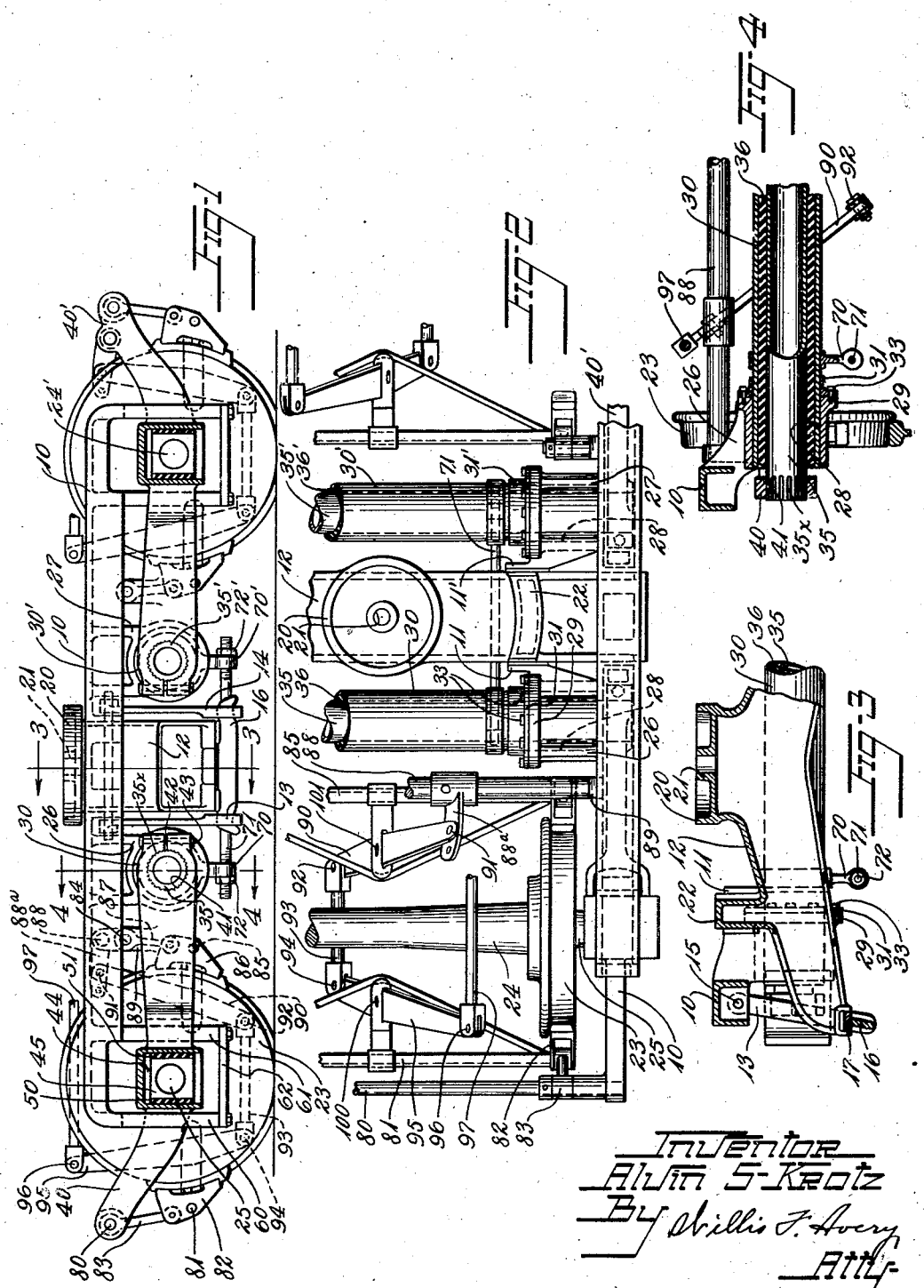
Inventor
Alvin S. Krotz
By Willis F. Avery
Atty.

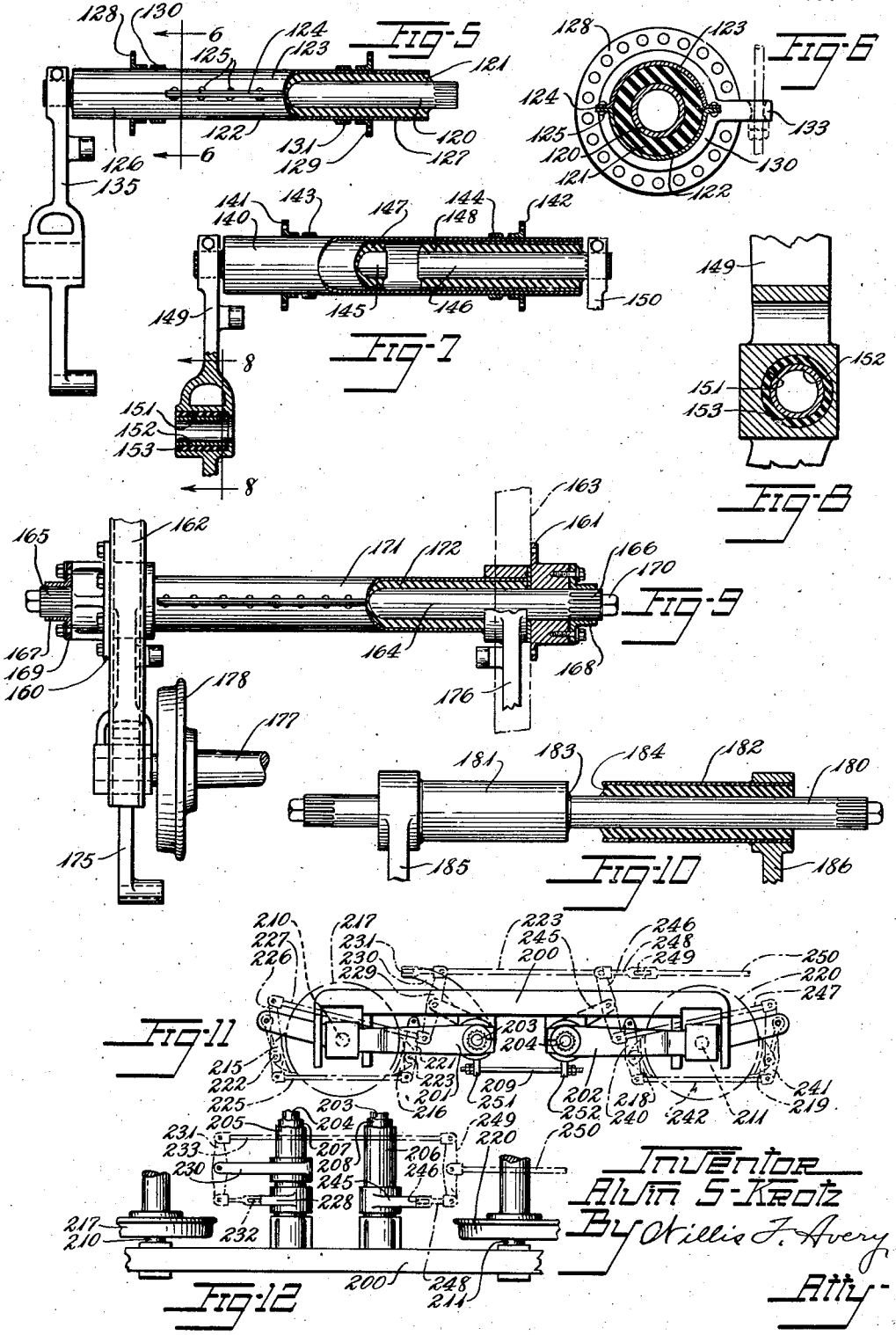

Patented Oct. 1, 1946

2,408,520

UNITED STATES PATENT OFFICE 2,408,520

TRUCK FOR RAIL VEHICLES

Alvin S. Krotz, Akron, Ohio, assignor to The B. F. Goodrich Company, New York, N. Y., a corporation of New York Application June 29, 1943, Serial No. 492,687

9 Claims. (Cl. 105—190)

This invention relates to vehicle trucks and more particularly to trucks for vehicles operated upon rails.

With increase in the speed of operation of railway trains and similar rail-operated vehicles it has become desirable to provide more effective cushioning of the load, to improve riding comfort, and to reduce noise and vibration, as well as to improve braking of the vehicle.

The principal objects of the present invention are to provide increased cushioning of the load, to damp out shock and vibration, to provide springing of the wheels of the truck, to eliminate contact of the journal boxes with the side frames, to provide improved braking of the wheel, and to provide adjustment of the cushioning means.

These and other objects will appear from the following description and the accompanying drawings.

Of the drawings,

Fig. 1 is a side elevation of a rail-truck constructed in accordance with and embodying the invention, parts being broken away and parts shown in section.

Fig. 2 is a plan view thereof, one side being broken away.

Fig. 3 is a sectional view taken on line 3—3 of Fig. 1.

Fig. 4 is a sectional view taken on line 4—4 of Fig. 1.

Fig. 5 is a detail view, partly broken away and partly in section showing a modified construction of the torsion cushioning means.

Fig. 6 is a sectional view thereof, taken on line 6—6 of Fig. 5.

Fig. 7 is a detail view of another modification of the invention, showing the torsion cushioning means, parts being broken away and parts shown in section.

Fig. 8 is a cross-sectional view taken on line 8—8 of Fig. 7.

Fig. 9 is a detail view showing a still further modification of the invention, parts being broken away and parts shown in section.

Fig. 10 is a detail view showing another modification of the invention, parts being broken away and parts shown in section.

Fig. 11 is a side elevation of a further modification of the invention.

Fig. 12 is a plan view thereof, partly broken away and partly in section.

Referring to the drawings, and first to the embodiment illustrated in Figs. 1 to 4 thereof, the numeral 10 designates one of a pair of truck side frames, one side only of the truck being shown in the drawings. Each side frame is formed with inwardly extending guide brackets 11, 11' adapted to guide a bolster 12. The bolster is suspended from the respective side frames by hanger links 13, 14 pivoted to the side frames, as at 15 and supporting stirrups such as 16 which engage under the ends of the bolster in fulcrum notches such as 17. The arrangement is such that the bolster has limited floating movement cross-wise of the truck but is restrained against fore-and-aft movement by the guide brackets 11 which closely flank its vertical sides. Preferably the fulcrum notches 17 are spaced farther apart than the pivots 15 of the side frames so that movement of the bolster from its normal position toward either side frame such as would be induced by the centrifugal force due to travel about a curved track is accompanied by elevation of the end of the bolster adjacent that side frame thereby tilting a car (not shown) supported by the bolster toward the center of curvature of the track and causing the floor of the car to assume a position more nearly perpendicular to the resultant of the vertical load of objects thereon and the centrifugal force acting upon them.

For supporting the vehicle from its truck and permitting relative rotational movement of the truck and the supported car body in a horizontal plane, the bolster 12 is formed with a center plate 20 on its upper surface surrounding a bearing 21 for a king pin. Outer side-bearing surfaces such as 22 are also provided on the bolster to contact corresponding surfaces on the car body during tilting movement. The entire weight of the car is normally carried on the center plate and transmitted through the bolster 12 and hanger links 13, 14 to the side frames 10.

For transmitting the load from the side frames to the track through the usual car wheels such as 23 mounted on an axle 24 having end journals 25, and at the same time holding the side frames in properly spaced relation, and cushioning the load upon said wheels, brackets 26, 27 are provided on each side frame fore and aft of the bolster guide brackets 11. These brackets 26, 27 have horizontally disposed through bores 28 terminating at their innermost margins in outwardly extending flanges 29, the bores 28 of brackets of the opposite side frames being in alignment on axes perpendicular to the side frames. Rotatably mounted in each opposite pair of bores 28 is the outer cylindrical shell or housing 30, 30', of a torsion bushing member having spacing flanges 31 secured thereto as by welding. The flanges 31 are secured to the flanges 29, which they engage face to face, by removable bolts 33 arranged in a circle about the flanges. The arrangement is such that the shells 30, which are of considerable diameter, act as cross-frame members to hold the side frames in spaced-apart relation and may be rotated for adjustment as hereinafter described by removing the bolts 33 and turning the shells to a new position, the bolts being equally spaced about the flanges for matching the flanges in a plurality of positions.

Extending through the bore of each shell 30, 30' is a longer shaft 35, 35' of smaller diameter enclosed by a bushing 36, 36' of resilient rubber or other rubber-like material adapted to resist relative rotation of the shell and its shaft by torsional deflection. The rubber bushing is bonded to the outer shell 30 and to the shaft 35 and extends the length of the shell, the shaft being of greater length so as to extend beyond the bushing and the shell at each end thereof. Each end of the shaft 35, which is preferably hollow, has an outer end surface portion 35× serrated to adjustably engage a torsion arm, such as the arms 40, 40'. Each torsion arm has an internally serrated hub 41 split at one side, as at 42 and provided with a clamp bolt 43 for clamping it to the shaft in an adjusted position. Each torsion arm normally extends substantially horizontally, and, at a distance from the shaft 35, is formed with a cross passage 44 for engaging about a journal box 45, which in turn engages about a journal 25 of a wheel axle. The arrangement is such that parallel torsion arms fixed to opposite ends of the same shaft 35 engage opposite journals of the same wheel axle 24 and transmit a portion of the load from the side frames through the torsion bushing 36 to the wheels 23 of a single axle 24, the second shaft 35' transmitting the remainder of the load in similar manner to the wheels of axle 24', and the entire vertical load on the truck being transmitted to the four wheels thereof through the torsion bushings and being cushioned thereby.

For providing for limited vertical movement of the wheels of one axle with relation to each other, journal boxes 45 are preferably made smaller than the through openings 44 of the torsion arms and are spaced from the vertical walls of said openings by resilient blocks 50, 51, of soft vulcanized rubber or other rubber-like material bonded by vulcanization or otherwise secured to the vertical faces of the journal boxes 45 and the through passages 44 facing them. These blocks support the load between the torsion arm 40 and the journal 25 by shear stress of the resilient material and permit such vertical movement as is provided above and below the journal box by the space between the box and the horizontal walls of the through passage 44. With this construction a single springing unit in the form of the torsion bushing extending transversely of the truck transmits the entire load between two wheels on the same axle and the body of the vehicle while the shear cushion mountings at the journal boxes compensate for slight differences in the level of the rails or other forces tending to lift one wheel higher than the other. While a live axle running in journal boxes has been shown, the axle may be fixed in the journal boxes and the wheels be mounted for rotation about the axle if desired.

While the chief purpose of the side frames is to transmit the load from the bolster to the shafts, the frames may also be employed for guiding and restraining movements of the torsion arms. For this purpose the side frames 10 may be provided with vertically disposed pedestals 60, 61, the pedestal 60 being disposed at one side of the arm 40 more remote from shaft 35 than the journal box 45 and the pedestal 61 being disposed at the other side of the arm 40 less remote from shaft 35 than the journal box and closely flanking the enlarged portion of the arm 40 enclosing the journal box. A strap 62 is attached to and across the lower ends of the depending pedestals to enclose the enlarged portion of arm 40 and limit its movement while bracing the pedestals from each other.

For holding the shells 30, 30' against rotation in addition to the bolted flanges 31, 31', and to hold adjustment of torsion on the resilient bushings when the bolts 33 are removed, and to provide adjusting means, the shells 30, 30' are provided with depending arms 70, 70' fixed thereto and having aligned openings at their lower ends through which a draw rod 71 extends. Nuts 72, 72' are threaded on the ends of the rod beyond the arms. The arrangement is such that when the nuts are drawn up against the arms 70, 70' the shear load on the bolts 33 is relieved and these may be removed and replaced, or by drawing the nuts up further, the shells may be rotated to the next bolt position thereby increasing the torsional loading, or backed off to relieve the torsional loading.

To provide uniform braking of the wheels substantially independent of the amount of deflection of the wheel supporting arms 40, 40', the brake controlling mechanism is mounted entirely on the arms. For this purpose a cross-rod 80 has its ends secured to the outer ends of arms 40 at opposite sides of the truck, and a brake beam 81, connecting a pair of brake shoes 82, one for engaging each wheel 23, is suspended therefrom by links 83. Each torsion arm 40 is provided with an ear 89. Studs, such as 84 on the same pair of arms 40 are fixed to ears 89 thereon and a second brake-beam 85, having brake shoes 86 at its ends, is suspended from studs 84 by links 87, the arrangement being such that brake blocks 82 and 86 engage the same wheel at approximately diametrically opposite positions.

A cross-rod 88 has its ends rotatably secured in the ears 89 of opposite torsion arms and has a lever arm 88a fixed thereto. A lever 90 is fulcrumed at 91 on the lever arm with its opposite end pivotally connected at 92 to a link 93. The other end of link 93 is pivotally connected at 94 to one end of a lever 95, the opposite end of which is pivotally connected to a brake rod 97 at 96. Lever 95 is pivotally connected to brake beam 81, as at 100, between its ends, and brake-beam 85 is pivotally connected to lever 90 between the ends of the lever. The brake rod 97 may be connected to any suitable operating mechanism (not shown) such as the piston rod of a fluid pressure cylinder. The arrangement is such that when the rod 97 is moved to the right in Figs. 1 and 2, the brake shoes 82 and 86 are pressed against the wheel. The pivot points 80 and 84 are so arranged that the brake shoes normally hang clear of the wheel. As the brake control mechanism is carried by the torsion arms, vertical movements of the torsion arms have substantially no effect upon operation of the brakes and do not affect their adjustment.

Referring to Figs. 5 and 6 of the drawings, in this modification of the invention the shaft 120 is identical in construction to the shaft 35 of Fig. 1 and is employed for the same purpose. The torsion bushing 121 of vulcanized rubber or other rubber-like material extends substantially from one serrated end of the shaft to the other and is bonded to the shaft by vulcanization. The outer housing or shell, however, is comprised of semi-cylindrical housing members 122, 123 having radially turned flanges 124 adapted to extend face to face. These flanges are perforated to receive bolts or rivets 125 for securing the housing members together. The flanges extend throughout a central portion of the housing but are omitted near the ends to provide unflanged cylindrical bearing portions 126, 127 to bear in the bores 28 of side frame brackets 26, 27, and to receive flanges 128, 129, corresponding to the flanges 31, 31' of Fig. 2, and collars 130, 131 having arms 133, corresponding to arms 70, 70' of Fig. 1.

The rubber torsion bushing 121 may be bonded as by vulcanization to the housing members or not, but is preferably so bonded. In any event the bushing is so constructed as to be subjected to radial compression when the housing members are secured to each other about it. Where the rubber is not first bonded to the housing, the radial compression is depended upon to hold the bushing frictionally from turning with relation to the housing. The flanges 128, 129, and the collars 130, 131 may be welded or otherwise secured about the assembled housing.

The torsion arm 135 corresponds to the arms 40 of Fig. 1. Due to the fact that a pair of arms are connected to the shaft 120 so that the wheels are deflected as a pair, this construction may be used in place of the torsion suspension shown in Fig. 1 on a truck of the type there disclosed.

The modification shown in Fig. 7 is also adapted to replace the torsion bushing suspension of Figs. 1 and 2. In this form of the invention the housing or shell 140 is identical with the shell 30 of Fig. 2 and has flanges 141, 142 secured thereto identical with flanges 31, 31' and also bands 143, 144 secured thereto for providing locking arms identical with the bands 130, 131 of Fig. 5. In place, however, of a continuous shaft, a pair of separate shafts 145, 146 are located in opposite ends of the housing, and separate bushings 147, 148 of vulcanized rubber or other resilient rubber-like material are provided about the respective shafts within the housing and bonded by vulcanization to the shafts and preferably to the housing. Torsion arms 149, 150, are adjustably clamped to the serrated extending ends of the shafts and support opposite ends of a wheel axle. The arms 149, 150 are formed with a cross passage, such as 151 providing a clearance opening for receiving a journal box 152 in which the axle is journaled. A resilient bushing 153 surrounds the journal box and is bonded to the arm 149 and the box 152.

In the form of the invention illustrated in Fig. 9, bearing plates 160, 161 are secured to side frames 162, 163, and have aligned bores for receiving a shaft 164 which extends therethrough and is adjustably rotatable therein. The ends of the shaft are serrated or splined, as at 165, 166 beyond the bearing plates.

Correspondingly serrated locking collars 167, 168 are slidably mounted on the serrated ends of the shaft and have flanges which are adjustably secured to the bearing plates against rotation by bolts 169. The arrangement is such that the shaft may be rotated with respect to the frame by removing bolts 169, removing collars 167, 168, returning them in an angularly advanced position and then securing them to the bearing plates. The ends of shaft 164 are squared beyond the locking collars, as at 170 for receiving a wrench to turn the shaft or hold it while making adjustments.

Extending about the shaft 164 in spaced relation thereto between the bearing plates, is a housing or shell 171 which may be of two semi-circular sections, as shown. A resilient torsion bushing 172 of vulcanized rubber or other rubber-like material is bonded to the shaft 164 and preferably to the housing 171 and extends therebetween from one bearing plate to the other to provide a torsional spring member. Torsion arms 175, 176 are fixed to the housing at opposite ends thereof and take the place of the arms 40 of Fig. 1. These arms enclose journal boxes in the same manner as the arms 40 of Fig. 1, and there rotatably support the axle 177 to which the wheels 178 are fixed. The arrangement is such that deflection of the arms 175, 176 under loading conditions rotates housing 171 about shaft 164 which is locked to the frame, thereby distorting the resilient bushing 172. Initial tension of the bushing may be adjusted by locking the shaft 164 against rotation, by use of a wrench, removing bolts 169, rotating the shaft 164 by use of the wrench to the desired position and then replacing the bolts 169. The bolts 169 are arranged in a circle and adjustments of less than the angle between bolt holes may be made by shifting the locking collars on the serrated ends of the shaft.

In the modification of Fig. 10, the shaft 180 is identical with the shaft 164 of Fig. 9 and is mounted on the frame members in the same manner. About the central portion of the shaft, however, are two housing members 181, 182 in spaced-apart relation each separated from the shaft by a torsion bushing, 183, 184, respectively. The torsion arms 185, 186 which are identical with arms 175, 176 of Fig. 9, and engage the wheel axle in the same manner, are fixed respectively to the housing members 181, 182.

In the form of the invention shown in Figs. 11 and 12 the load is supported on a bolster from the side frames as in Fig. 1. The numeral 200 designates one of the side frames which are similar to the side frames shown in Fig. 1. The load is transmitted to the axles from the side frames by torsion arms 201, 202 secured to the ends of parallel shafts 203, 204 which extend through adjustably rotatable shells or housings 205, 206 fixed to the side frames. Resilient bushings 207, 208 of vulcanized rubber or other rubber-like material are bonded to the shafts 203, 204 respectively, which they partially enclose, and to the housings 205, 206 through which they respectively extend. The housings are rotatively adjustable with respect to the side frames as in the embodiment of Fig. 1, and have arms 251, 252 fixed thereto and an adjusting rod 209 extending therebetween as in the embodiment of Fig. 1. The axles 210, 211 may be rotatably journaled in the arms 201, 202 or may be journaled in bushings as in Fig. 8 or in floating journal boxes supported from the arms by rubber shear mountings as shown in Fig. 1.

The brake controlling mechanism is suspended entirely from the arms 201, 202 and the housings 205, 206 in such manner as to provide a minimum alteration of brake adjustment with deflection of arms 201, 202 or with rotational adjustment of housings 205, 206. For this purpose brake shoes 215, 216 are mounted on brake-beams 222, 223 at opposite sides of wheel 217 suspended from arms 201, and brake shoes 218, 219 are similarly arranged at wheel 220 on arms 202. A lever 221 is fulcrumed on the brake-beam 223 and one end thereof is pivotally connected to arm 201 while its opposite lower end is pivotally connected to a link 225. A lever 226 is fulcrumed on brake-beam 222 and its lower end is pivotally connected to the link 225 while its upper end is pivotally connected to a link 227. An arm 228 is fixed to the housing 205. A lever 229 is pivoted at the end of the arm 228 and extends vertically. The lower end of lever 229 is pivotally connected to the upper end of lever 226 by the link 227. A second arm 230 is fixed to housing 205 and a lever 231 is fulcrumed thereon. One end of the lever 231 which extends horizontally is connected to the upper end of lever 229 by a link 232, and the other end is pivotally connected to a link 233.

At the other axle of the truck, brake shoes 218, 219 are similarly supported from arm 202 by links and are adapted to be operated by levers 240, 241 fulcrumed on the brake beams. These levers have their lower ends pivotally connected by a link 242 to each other. The upper end of lever 240 is pivotally secured to arm 202. An arm 245 is fixed to housing 206 and has a vertically disposed lever 246 fulcrumed thereon. The lower end of lever 246 is pivotally connected to the upper end of lever 241 by a link 247. The upper end of lever 246 is connected by a link 248 to an equalizer bar 249, the other end of which is connected to link 233. The center of the equalizer bar is pivotally connected to a brake operating rod 250. The arrangement is such that movement of the rod 250 to the right in Figs. 11 and 12 applies all the brakes to the wheels simultaneously. The fulcrum points of levers 229 and 246 are arranged at the same radius from the center lines of shafts 203, 204 respectively, as the pivot points of the nearest ends of links 227, 247, so that at any deflection of arms 201, 202 under loading, little if any movement of the brakes with relation to the wheels will occur, and rotational adjustment of housings 205, 206 will also have only small effect upon brake adjustment.

In any of the embodiments of the invention the entire vertical load is carried by the resilient bushings in torsional shear and metallic springs are avoided.

Variations may be made without departing from the scope of the invention as it is defined by the following claims.

I claim:

1. A truck for a rail vehicle comprising a bolster for supporting the body of a vehicle, a frame structure from which said bolster is suspended, a tubular housing adjustably fixed to said frame structure and extending laterally of the truck from side to side thereof to constitute a frame member, a shaft extending axially within said housing, a resilient torsion bushing between said housing and said shaft, said bushing being fixed to said housing and said shaft for torsional flexing, a rail wheel, and an arm adjustably fixed to said shaft and having a journal box for engaging the axle of said wheel.

2. A truck for a rail vehicle comprising a bolster for supporting the body of a vehicle, a frame structure from which said bolster is suspended, a tubular housing adjustably fixed to said frame structure and extending laterally of the truck from side to side thereof and constituting a cross-frame member of said frame structure, a shaft extending axially within said housing, a resilient torsion bushing between said housing and said shaft, said bushing being fixed to said housing and said shaft for torsional flexing, a rail wheel, and an arm adjustably fixed to said shaft and having a journal box for engaging the axle of said wheel, said journal box being mounted in said arm for limited movement with respect thereto.

3. A truck for a rail vehicle comprising a bolster for supporting the body of a vehicle, a frame structure from which said bolster is suspended, a tubular housing adjustably fixed to said frame structure and extending laterally of the truck from side to side thereof and constituting a cross-frame member of said frame structure, a shaft extending axially within said housing, a resilient torsion bushing between said housing and said shaft, said bushing being fixed to said housing and said shaft for torsional flexing, a rail wheel, and an arm adjustably fixed to said shaft and having a journal box for engaging the axle of said wheel, said journal box being separated from said arm by a resilient mounting adapted to be deflected by shear loading.

4. A truck for a rail vehicle comprising a bolster for supporting the body of a vehicle, a frame structure comprising a pair of laterally spaced side frame members from which said bolster is suspended, a pair of tubular housings extending from one side frame to the other and adjustably secured thereto, said housings comprising means for spacing said side frames from each other, a shaft extending axially within one of said housings, a resilient torsion bushing between said housing and said shaft, said bushing being fixed to said housing and said shaft for torsional flexing, a rail wheel, and an arm fixed to said shaft and having a journal box for engaging an axle of said wheel.

5. A truck for a rail vehicle comprising a bolster for supporting the body of a vehicle, a frame structure comprising a pair of laterally spaced side frame members from which said bolster is suspended, a pair of tubular housings extending from one side frame to the other and adjustably secured thereto, said housings comprising substantially the entire means for spacing said side frames from each other and bracing the same, a shaft extending axially within one of said housings, a resilient torsion bushing between said housing and said shaft, said bushing being fixed to said housing and said shaft for torsional flexing, a rail wheel, and an arm fixed to said shaft and having a journal box for engaging an axle of said wheel, said arm being adjacent one of said side frames, and the adjacent side frame having means for guiding said arm.

6. A truck for a rail vehicle comprising a bolster for supporting the body of a vehicle, a frame structure comprising a pair of laterally spaced side frame members from which said bolster is suspended, a pair of tubular housings extending from one side frame to the other and adjustably secured thereto, said housings comprising means for spacing said side frames from each other, resilient torsion bushings secured within each end of each housing, a shaft secured within one of said bushings and extending axially of said housing, a rail wheel having an axle, and an arm secured to a projecting end of said shaft, said arm having means for engaging the axle of said wheel to transmit the vehicle load to said wheel from said bolster.

7. A truck for a rail vehicle, said truck comprising a rail wheel, a frame structure, and a torsion spring structure for transmitting load from said frame structure to said wheel, said torsion spring structure comprising a tubular rotatably adjustable housing nonrotatably secured to said frame structure and extending from side to side thereof and constituting a principal cross-frame member of said frame structure, a shaft member extending axially of and within said housing, and a body of resilient rubber-like material within said housing about said shaft and mounted to sustain said load by torsional stress of said material.

8. A truck for a rail vehicle comprising rail wheels, a pair of side frame members, a pair of tubular frame members spaced-apart fore and aft of the truck and extending from a side frame member to the other and secured to both, shafts in said tubular frame members, arm structures connecting said shafts with said wheels, bodies of resilient rubber-like material mounted between said shafts and said tubular frame members for resisting wheel deflection by torsional stress on said material, and a bolster structure swung in the frame between said tubular frame members.

9. A truck for a rail vehicle, said truck comprising an axle having rail wheels secured thereto, a frame structure, and a torsion spring structure constituting the sole means for transmitting the load from said frame structure to said axle, said torsion spring structure comprising a tubular rotatably adjustable housing nonrotatably secured to said frame structure and extending from side to side thereof and constituting a principal cross-frame member of said frame structure, a shaft extending axially of and within said housing, a body of resilient rubber-like material within said housing about said shaft and mounted to sustain said load by torsional stress of said material, and an arm secured to an end of said shaft and provided with means for retaining said axle.

ALVIN S. KROTZ.